United States Patent
Behzad et al.

(10) Patent No.: US 7,840,198 B2
(45) Date of Patent: Nov. 23, 2010

(54) METHOD AND SYSTEM FOR PROCESSING SIGNALS IN A HIGH PERFORMANCE RECEIVE CHAIN

(75) Inventors: Arya Behzad, Poway, CA (US);
Adedayo Ojo, San Diego, CA (US);
Yuyu Chang, Irvine, CA (US);
Hung-Ming Chien, Irvine, CA (US);
Kishore Rama Rao, San Diego, CA (US); Guruprasad Seetharam, San Diego, CA (US)

(73) Assignee: Broadcom Corp., Irvine, CA (US)

( * ) Notice: Subject to any disclaimer, the term of this patent is extended or adjusted under 35 U.S.C. 154(b) by 654 days.

(21) Appl. No.: 11/733,047

(22) Filed: Apr. 9, 2007

(65) Prior Publication Data

US 2008/0139119 A1 Jun. 12, 2008

Related U.S. Application Data

(60) Provisional application No. 60/868,818, filed on Dec. 6, 2006.

(51) Int. Cl.
*H04B 1/04* (2006.01)
(52) U.S. Cl. .................. 455/127.3; 455/253.1; 330/51
(58) Field of Classification Search ............. 455/127.1, 455/127.3, 253.1, 552.1; 330/51
See application file for complete search history.

(56) References Cited

U.S. PATENT DOCUMENTS

| | | | | |
|---|---|---|---|---|
| 7,197,336 B2* | 3/2007 | Paramesh et al. | ........ | 455/562.1 |
| 7,251,499 B2* | 7/2007 | Ella et al. | ................ | 455/552.1 |
| 2007/0053472 A1* | 3/2007 | Feher | ........................ | 375/347 |

* cited by examiner

*Primary Examiner*—Nhan Le
(74) *Attorney, Agent, or Firm*—McAndrews, Held & Malloy, Ltd.

(57) ABSTRACT

Aspects of a method and system for processing signals in a high performance receive chain may include amplifying radio frequency signals in amplifier chains in a multistandard radio frequency front-end, comprising one or more shared processing stages, and combining, with substantially equal gain, a number of phase-shifted radio frequency signals of the radio frequency signals into substantially equal-gain-combined radio frequency signals. The substantially equal-gain-combined radio frequency signals may be demodulated to obtain inphase channels and quadrature channels. A number of inphase channels and quadrature channels may be processed in I-channel processing blocks and Q-channel processing blocks to generate an output analog baseband signal. The multistandard radio frequency front-end may be capable of processing Bluetooth® signals and Wireless Local Area Network (WLAN) signals. The amplifier chains may comprise a first amplifier and a second amplifier, where the first amplifier may be shared between Bluetooth® signal processing paths and WLAN signal processing paths.

32 Claims, 1 Drawing Sheet

METHOD AND SYSTEM FOR PROCESSING SIGNALS IN A HIGH PERFORMANCE RECEIVE CHAIN

CROSS-REFERENCE TO RELATED APPLICATIONS/INCORPORATION BY REFERENCE

This application makes reference to, claims priority to, and claims the benefit of U.S. Provisional Application Ser. No. 60/868,818, filed on Dec. 6, 2006.

The above stated application is hereby incorporated herein by reference in its entirety.

FIELD OF THE INVENTION

Certain embodiments of the invention relate to signal processing for communication systems. More specifically, certain embodiments of the invention relate to a method and system for processing signals in a high performance receive chain.

BACKGROUND OF THE INVENTION

The use of Wireless Personal Area Networks (WPANs) has been gaining popularity in a great number of applications because of the flexibility and convenience in connectivity they provide. WPAN systems, such as those based on Class 2 Bluetooth® (BT) technology, generally replace cumbersome cabling and/or wiring used to connect peripheral devices and/or mobile terminals by providing short distance wireless links that allow connectivity within a 10-meter range. Though, for a limited number of applications, higher-powered Class 1 BT devices may operate within a 100-meter range. In contrast to WPAN systems, Wireless Local Area Networks (WLANs) provide connectivity to devices that are located within a slightly larger geographical area, such as the area covered by a building or a campus, for example. WLAN systems are based on IEEE 802.11 standard specifications, typically operate within a 100-meter range, and are generally utilized to supplement the communication capacity provided by traditional wired Local Area Networks (LANs) installed in the same geographic area as the WLAN system.

In some instances, WLAN systems may be operated in conjunction with WPAN systems to provide users with an enhanced overall functionality. For example, Bluetooth® technology may be utilized to connect a laptop computer or a handheld wireless terminal to a peripheral device, such as a keyboard, mouse, headphone, and/or printer, while the laptop computer or the handheld wireless terminal is also connected to a campus-wide WLAN network through an access point (AP) located within the building.

Both Bluetooth® and WLAN radio devices, such as those used in, for example, handheld wireless terminals, generally operate in the 2.4 GHz (2.4000-2.4835 GHz) Industrial, Scientific, and Medical (ISM) unlicensed band. WLAN may also operate in the 5 GHz ISM band. Other radio devices, such as those used in cordless phones, may also operate in the ISM unlicensed band. In some devices, WLAN signals for both the 2.4 GHz band and the 5 GHz band may be processed, in addition to Bluetooth®. Such an approach may require individual receive chains for each technology and sub-standard that may be enabled by the receiver.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for processing signals in a high performance receive chain, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 2 is a block diagram illustrating an exemplary multi-band Wireless LAN (WLAN) and Bluetooth® (BT) RF front-end with 2 antennas, in accordance with an embodiment of the invention.

FIG. 3A is a block diagram illustrating an exemplary dual antenna multistandard analog RF amplifier and WLAN demodulator front end, in accordance with an embodiment of the invention.

FIG. 3B is a block diagram illustrating an exemplary analog baseband processing chain, in accordance with an embodiment of the invention.

DETAILED DESCRIPTION OF THE INVENTION

Figure 1:
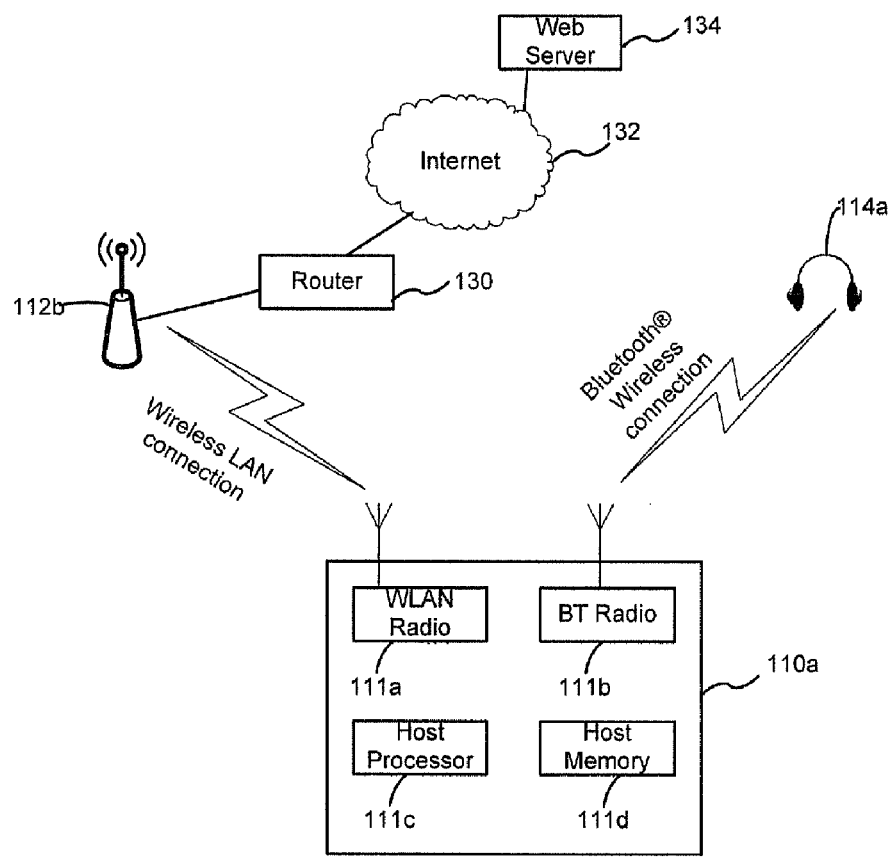
FIG. 1 is a diagram illustrating an exemplary WLAN and Bluetooth® wireless communication system, in connection with an embodiment of the invention.

Certain embodiments of the invention may be found in a method and system for processing signals in a high performance receive chain. Aspects of the method and system for processing signals in a high performance receive chain may include amplifying radio frequency signals in amplifier chains in a multistandard radio frequency front-end, comprising one or more shared processing stages, and combining, with substantially equal gain, a number of phase-shifted radio frequency signals of the radio frequency signals into substantially equal-gain-combined radio frequency signals. The substantially equal-gain-combined radio frequency signals may be demodulated to obtain inphase channels and quadrature channels. A number of inphase channels and quadrature channels may be processed in I-channel processing blocks and Q-channel processing blocks to generate an output analog baseband signal. The multistandard radio frequency front-end may be capable of processing Bluetooth® signals and Wireless Local Area Network (WLAN) signals. The amplifier chains comprise at least a first amplifier and a second amplifier, where the first amplifier may be shared between Bluetooth® signal processing paths and WLAN signal processing paths. The second amplifier may isolate the Bluetooth® signal processing paths from the WLAN local oscillator signals, and the WLAN signal processing paths from the Bluetooth® local oscillator signals. The substantially equal-gain-combined signals may be demodulated by transconductance multipliers. The inphase channels and quadrature channels may be filtered and amplified using transimpedance amplifiers with low-pass filtering characteristics in the I-channel processing blocks and the Q-channel processing blocks. The I-channel processing blocks and the Q-channel processing blocks may comprise filters that are switchable between different filtering characteristics, DC loops that may be used to compensate DC offset introduced by the filters and variable gain amplifiers that may comprise DC loops to compensate introduced DC offset.

FIG. 1 is a diagram illustrating an exemplary WLAN and Bluetooth® wireless communication system, in connection with an embodiment of the invention. Referring to FIG. 1, there is shown a WLAN access point 112b, a computer 110a, a Bluetooth® headset 114a, a router 130, the Internet 132 and a web server 134. The computer or host device 110a may comprise a wireless LAN (WLAN) radio 111a, a Bluetooth® radio 111b, a host processor 1111c, and a host memory 1111d. There is also shown a Wireless LAN (WLAN) connection between the wireless LAN radio 111a and the wireless LAN access point 112b, and a Bluetooth® wireless connection between the Bluetooth® radio 111b and the Bluetooth® headset 114a.

Frequently, computing and communication devices may comprise hardware and software to communicate using multiple wireless communication standards. The WLAN radio 111a may be compliant with IEEE 802.11 standard. There may be instances when the WLAN radio 111a and the Bluetooth® radio 111b are active concurrently. For example, it may be desirable for a user of the computer or host device 110a to access the Internet 132 in order to consume streaming content from the Web server 134. Accordingly, the user may establish a WLAN connection between the computer 110a and the access point 112b. Once this connection is established, the streaming content from the Web server 134 may be received via the router 130, the access point 112b, and the WLAN connection, and consumed by the computer or host device 110a.

It may be further desirable for the user of the computer 110a to listen to an audio portion of the streaming content on the Bluetooth® headset 114a. Accordingly, the user of the computer 110a may establish a Bluetooth® wireless connection with the Bluetooth® headset 114a. Once the Bluetooth® wireless connection is established, and with suitable configurations on the computer enabled, the audio portion of the streaming content may be consumed by the Bluetooth® headset 114a.

FIG. 2 is a block diagram illustrating an exemplary multiband Wireless LAN (WLAN) and Bluetooth® (BT) RF front-end with 2 antennas, in accordance with an embodiment of the invention. Referring to FIG. 2, there is shown antennas 202 and 204 and an analog RF front-end 200. The analog RF front-end 200 may comprise 2.4 GHz BT/LWAN Amplifier 292 and 294, a 2.4 GHz BT amplifier 216, a 2.4 GHz BT amplifier dummy 220, 2.4 GHz WLAN amplifiers 228 and 232, 5 GHz WLAN amplifiers 230 and 234, adders 222 and 224, multiplexers (MUX) 226 and 227, a WLAN RF demodulator 210, an I-channel processing block 212, a Q-channel processing block 206, and an antenna diversity switch 290.

The antenna diversity switch 290 may be used to enable or disable antenna diversity, sometimes also referred to as spatial diversity. When the antenna diversity switch 290 is in its upper position depicted in FIG. 2, the 2.4 GHz BT/LALN amplifier 292, the 2.4 GHz BT amplifier 216, the 2.4 GHz WLAN amplifier 228 and the 5 GHz WLAN amplifier 230 may be communicatively coupled to antenna 202, while the 2.4 GHZ BT/WLAN amplifier 294, the 2.4 GHz BT amplifier dummy 220, the 2.4 GHz WLAN amplifier 232 and the 5 GHz WLAN amplifier 234 may be communicatively coupled to antenna 204. The 2.4 GHZ BT/WLAN amplifier 292 may comprise suitable logic, circuitry and/or code that may enable the amplification of a plurality of signals and/or standards in the 2.4 GHz ISM band, for example, Bluetooth® and WLAN. The 2.4 GHz BT/WLAN amplifier 292 may hence be used as a common first amplification stage for a plurality of signals that may conform to a plurality of communication standards. The 2.4. GHz BT/WLAN amplifier 294 may be substantially similar to the 2.4 GHz BT/WLAN amplifier 292.

In the depicted position of the antenna diversity switch 290, the received signal at the antenna 202 and the received signal at the antenna 204 may hence be processed in different amplifiers. In these instances, the output signals of the 2.4 GHz WLAN amplifier 228 and the 2.4 GHz WLAN amplifier 232 may be combined in the adder 224. The output signal of the 5 GHz WLAN amplifier 230 may be combined with the output signal of the 5 GHZ WLAN amplifier 234 in adder 222. Combining the signals in this manner, referred to as Equal Gain Combining (EGC), may help to improve the signal quality with respect to using a single antenna. In particular, combining the signals from antennas 202 and 204 in the adders 222 and 224 may reduce the variance of the RF signal and may increase the Signal-to-Noise ratio. This may help to offset performance loss that may be due to fading, a channel impairment that may frequently be encountered in wireless systems. The system depicted in FIG. 2 may be extended to combine received signals of more than two antennas. EGC may be performed for WLAN signals. Bluetooth signals received in the 2.4 GHz BT amplifier 216 may be processed further elsewhere and EGC for Bluetooth® signals may not be performed in the analog front-end 200. The 2.4. GHz BT amplifier dummy 220 may not process any BT signals. The function of the BT amplifier dummy 220 may be to enable load balancing of the 2.4 GHz BT/WLAN amplifiers 292 and 294, so that the impedance that may be seen may be similar. When the antenna diversity switch 290 is in its lower position, depicted as the non-selected switch position of switch 290 in FIG. 2, all amplifiers 216, 228, 230, 220, 232 and 234 may be communicatively coupled to antenna 204. In these instances, EGC may not offer any performance benefits since the signals that may be combined in the adders 222 and 224 may originate from the same antenna 204.

In the WLAN RF demodulator 210, both the 2.4 GHz signal received from adder 224 and the 5 GHz signal received from adder 222 may be demodulated. The I-channels resulting from the 2.4 GHz signal and the 5 GHz signal may be fed to the multiplexer 226 and the Q-channels resulting from the 2.4 GHz signal and the 5 GHz signal may be fed to the multiplexer 227. The multiplexers 226 and 227 may then select either the 2.4 GHz I-channel and Q-channel or the 5 GHz I-channel and Q-channel to be fed to the I-channel processing block 212 and the Q-channel processing block 206, respectively. By using the multiplexers 226 and 227, the I-channel processing block 212 and the Q-channel processing block 206 may be used for processing baseband signals from the 2.4 GHz signal or the 5 GHz signal. The output of the I-channel processing block 212 and the Q-channel processing block 206 may be fed to an I-channel Analog-to-Digital Converter (ADC) and a Q-channel ADC, respectively.

FIG. 3A is a block diagram illustrating an exemplary dual antenna multistandard analog RF amplifier and WLAN demodulator front end, in accordance with an embodiment of the invention. Referring to FIG. 3A, there is shown antennas 302 and 304, switches 314, 318 and 390, a BT amplifier 316, a BT Dummy amplifier 320, antenna amplifier chains 306 and 308, adders 322 and 324, a demodulator 310, and an I-channel multiplexer 326. The antenna amplifier chain 306 may comprise a 2.4 GHz amplifier chain 328 and a 5 GHz amplifier chain 330. The 2.4 GHz amplifier chain 328 may comprise a bandpass filter (BPF) 336, amplifiers 338 and 340, and phase shifter 342. The 5 GHz amplifier chain 330 may comprise amplifiers 344 and 346, and phase shifter 348. The antenna amplifier chain 308 may comprise a 2.4 GHz amplifier chain 332 and a 5 GHz amplifier chain 334. The 2.4 GHz amplifier chain 332 may comprise a bandpass filter (BPF) 350, amplifiers 352 and 354, and phase shifter 356. The 5 GHz amplifier chain 334 may comprise amplifiers 358 and 360, and phase shifter 362. The demodulator 310 may comprise multipliers 364, 366, 368 and 370. There is also shown in FIG. 3A, signals TX loopback 1, TX loopback 2, LOI 2.4 GHz, LOQ 2.4 GHz, LOI 5 GHz and LOQ 5 GHz. The TX loopback 1 signal and the TX loopback 2 signal may be RF signals that may be fed back from a WLAN transmitter into the WLAN receiver chain 328 and 332, respectively, and may calibrate the receiver structure inphase and quadrature imbalance. The LOI 2.4 GHz and LOI 5 GHz signals are Local Oscillator signals that may be used for demodulating the inphase components at 2.4 GHz and 5 GHz, respectively. The LOQ 2.4 GHz and LOQ 5 GHz signals are Local Oscillator signals that may be used for demodulating the quadrature components at 2.4 GHz and 5 GHz, respectively.

The 2.4 GHz amplifier chains 328 and 332 may correspond to the 2.4 GHz WLAN amplifiers 228 and 232 illustrated in FIG. 2. The 5 GHz amplifier chains 330 and 334 may correspond to the 5 GHz WLAN amplifiers 230 and 234 illustrated in FIG. 2. The BT amplifier 316 and the BT amplifier dummy 320 may correspond to the 2.4 GHz BT amplifier 216 and the 2.4 GHz BT amplifier dummy 220, illustrated in FIG. 2. As explained for FIG. 2, the BT amplifier dummy 320 may be used for load balancing between the amplifiers 338 and 352, since the BT signal processing may not utilize antenna diversity. Thus, the Wireless LAN signal branch and the BT signal branch may share a common amplifier 338 in the 2.4 GHz amplifier chain 328, and common amplifier 352 in 2.4 GHz amplifier chain 332. The WLAN signal path and the BT signal path may branch off and continue independently at the outputs of amplifiers 338 and 352.

The bandpass filters 336 and 350 that may be comprised in the 2.4 GHz amplifier chains 328 and 334, respectively, may be used to attenuate interfering signals from neighboring cellular bands, especially the bands around 1.9 GHz and, to a lesser extend, 900 MHz. Since the 5 GHz WLAN frequency band may benefit from a larger separation in frequency from the cellular bands, a bandpass filter may not be required in the 5 GHz amplifier chains 330 and 334. The amplifiers 338, 344, 352 and 358 may be the first amplifier after the antennas in the amplifier chains 328, 330, 332 and 334, respectively. For this reason, amplifiers 338, 344, 352 and 358 may also comprise a balun that may convert the input signal to a balanced differential signal. The BT amplifier 316 may be communicatively coupled to the output of amplifier 338 and hence the BT and WLAN radio may share the same first amplifier (and integrated balun) 338. The amplifier 340 may further amplify the received 2.4 GHz signal fed to it via the BPF 336 and the amplifier 338. The amplifier 340 may also provide increased decoupling against leakage between the 2.4 GHz BT signal processing and the 2.4 GHz WLAN signal processing. The second stage amplifiers 340, 346, 354 and 360 may also provide gain to compensate for noise introduced in the phase shifters 342, 348, 356 and 362. In the 2.4 GHz amplifier chain 332, the implementation of the 2.4 GHz amplifier chain 328 may be mirrored to obtain good load balancing, although the BT amplifier dummy 320 output signal may not be further processed.

The phase shifters 342 and 356 may be used to co-phase the received signals of the 2.4 GHz amplifier chains 328 and 332 in order to permit a constructive summation of their respective signals in the adder 324. A constructive summation of the output signals of the 2.4 GHz amplifier chains 328 and 332 may be achieved if the two signals may be combined into a single stronger signal. A destructive summation of the output signals of the 2.4 GHz amplifier chains 328 and 332 may be achieved if the two signals may be combined into a single weaker signal, which may be due to the signals partially canceling each other. The phase shifters 348 and 362 of the 5 GHz amplifier chains 330 and 334 may perform a similar task for the 5 GHz WLAN signals that may be combined in adder 322. The combining of signals that may take place in the adders 322 and 324 may be referred to as Equal Gain Combining (EGC).

After EGC in the adders 322 and 324, the output signals of the adders may be fed to the demodulator 310 where the signals may be transformed into baseband signals and divided into inphase and quadrature components. The 2.4 GHz output signal from adder 324 may be fed to multipliers 366 and 364 where the signal may be multiplied with local oscillator signals LOI 2.4 GHz and LOQ 2.4 GHz to obtain the inphase and quadrature components of the 2.4 GHz output signal of adder 324, respectively. Equivalently, the 5 GHz output signal from adder 322 may be fed to multipliers 368 and 370 where the signal may be multiplied with local oscillator signals LOI 5 GHz and LOQ 5 GHz to obtain the inphase and quadrature components of the 5 GHz output signal of adder 322, respectively. The resulting inphase components from multipliers 366 and 368 may then be fed to the multiplexer 326. In multiplexer 326, the inphase component resulting from the 5 GHz received signal or the inphase signal resulting from the 2.4 GHz signal may then be switched to the output of multiplexer 326 and be fed to the I-channel processing via connector A, that may connect to the block diagram shown in FIG. 3B. The output of the multipliers 364 and 370 may also be fed to a multiplexer (not shown) that may then switch the quadrature baseband signal resulting from the 2.4 GHz received signal or the 5 GHz received signal to a Q-channel processing block. The multiplexer 326 for the I-channel component may correspond to the multiplexer 226 illustrated in FIG. 2. The multipliers 364, 366, 368 and 370 may be implemented as transconductance multipliers, that is, the multiplier output may be a current proportional to the product of two input voltages. The amplifier 338 may be used as a common first amplifier stage for WLAN and any other technology in the 2.4 GHz ISM band. This may include, but is not limited to, ZigBee™.

FIG. 3B is a block diagram illustrating an exemplary analog baseband processing chain, in accordance with an embodiment of the invention. Referring to FIG. 3B, there is shown an I-channel processing block 312. The I-channel processing block 312 may comprise a transimpedance amplifier (TIA) 372, a low-pass filter (LPF) 376, DC loops 374 and 382, a multiplexer 378, and a variable-gain amplifier (VGA) 380. The TIA 372 may comprise an amplifier 384, a variable capacitor 386 and a variable resistor 388.

The I-channel block 312 may be connected via connector A to the multiplexer 326 in FIG. 3A. A Q-channel processing block may be functionally identical to the I-channel processing block 312. The input signal to the I-channel processing block 312 may be a current signal that may be proportional to a product of two voltage signals, as explained for FIG. 3A. The TIA 372 may convert the input current signal to a voltage signal. In addition, the variable capacitor 386 and the variable resistor 388 may form a first order pole filter that may act as a first stage of low-pass filtering of the input signal to the TIA 372. The output signal from the TIA 372 may be fed to the input of the low-pass filter 376. The low-pass filter 376 may be a high-quality filter, for example, a $5^{th}$ order Chebyshev filter. The LPF 376 may be used to attenuate undesired lowfrequency components in the demodulated baseband signal. The LPF 376 may be switchable between different bandwidths and frequencies in order to accommodate different Wireless LAN operating modes and frequencies in both the 2.4 GHz band and the 5 GHz band. The DC loop 374 may be used to compensate for any DC offset that may be introduced by the LPF 376 and prior stages in the receiver chain, particularly, but not limited to, the demodulator 310 and the TIA 372. The multiplexer 378 may switch one of its input signals to its output, as a function of the receivers operating mode. When multiplexer 378 may switch through the input signal at its input 0, the receiver may operate in ordinary receive mode. When the receiver may need to operate in loopback mode, the signal at input 1 may be switched through. In loopback mode, signals from the WLAN transmitter may be fed back to the WLAN receiver for calibration purposes. In these instances, the desired bandwidth of the signal required for calibration may be larger than what may ordinarily pass the LPF 376. For this reason, the LPF 376 may be bypassed in loopback mode and the output signal from the TIA 372 may be directly fed to the multiplexer 378. In a third operating mode, the multiplexer 378 may switch input 2 through to its output. In these instances, a power amplifier predistortion signal may be fed to the variable gain amplifier 380 directly from the amplifier to calibrate power amplifier non-linearity by exploiting the variable gain amplifier 380 and the, possibly, high-resolution of a Analog-to-digital converter that may be fed by the I-channel processing block 312. The variable gain amplifier 380 may be used to amplify the output signal from the multiplexer 378. The DC loop 382 may be used to remove any DC offset that may be introduced by the VGA 380, and possible residual DC offsets from, for example, the LPF 376, the TIA 372 or the demodulator 310. The output of the VGA 380 may be fed to an analog-to-digital converter where the signal may be conditioned for further digital signal processing.

In accordance with an embodiment of the invention, a method and system for processing signals in a high performance receive may comprise amplifying radio frequency signals in amplifier chains 328, 330, 332 and 334 in a multistandard radio frequency front-end 306 and 308, comprising one or more shared processing stages, and combining, with substantially equal gain, a number of phase-shifted radio frequency signals of the radio frequency signals into substantially equal-gain-combined radio frequency signals in adders 322 and 324, as shown in FIG. 3A. The substantially equal-gain-combined radio frequency signals may be demodulated to obtain inphase channels and quadrature channels as shown in demodulator 310 in FIG. 3A.

A number of inphase channels and quadrature channels may be processed in I-channel processing blocks and Q-channel processing blocks to generate an output analog baseband signal, for example I-channel processing block 212 and Q-channel processing block 206, illustrated in FIG. 2. The multistandard radio frequency front-end may be capable of processing Bluetooth® signals and Wireless Local Area Network (WLAN) signals. The amplifier chains, for example 328 in FIG. 3A, may comprise at least a first amplifier 338 and a second amplifier 340, where the first amplifier 338 may be shared between Bluetooth® signal processing paths and WLAN signal processing paths. The second amplifier 340 may isolate the Bluetooth® signal processing paths from the WLAN local oscillator signals, and the WLAN signal processing paths from the Bluetooth® local oscillator signals. The WLAN oscillator signals may be generated in the demodulator 310. The substantially equal-gain-combined signals may be demodulated by transconductance multipliers 364, 366, 368 and 370.

The inphase channels and quadrature channels may be filtered and amplified using transimpedance amplifiers 372 with low-pass filtering characteristics in the I-channel processing blocks 212 and the Q-channel processing blocks 206. As illustrated in FIG. 3A, the I-channel processing blocks and the Q-channel processing blocks may comprise filters 376 that are switchable between different filtering characteristics, and DC loops 374 may be used to compensate DC offset introduced by the filters 376. The I-channel processing blocks and the Q-channel processing blocks may comprise variable gain amplifiers 380 that may comprise DC loops 382 to compensate introduced DC offset.

Another embodiment of the invention may provide a machine-readable storage, having stored thereon, a computer program having at least one code section executable by a machine, thereby causing the machine to perform the steps as described above for a method and system for processing signals in a high performance receive chain.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing communication signals, the method comprising:
 amplifying a plurality of radio frequency signals in one or more respective one or one of a plurality of amplifier chains in a multistandard radio frequency front-end comprising one or more shared processing stages, wherein:
  said plurality of radio frequency signals are compliant with a plurality of radio frequency communication standards;
  said one or more shared processing stages are shared between two or more of said plurality of amplifier chains;

each of said two or more of said plurality of amplifier chains are operable to amplify signals compliant with different ones of said plurality of radio frequency communication standards; and combining, with substantially equal gain, a number of phase-shifted radio frequency signals of said amplified plurality of radio frequency signals into a plurality of substantially equal-gain-combined radio frequency signals.

2. The method according to claim 1, comprising demodulating said plurality of substantially equal-gain-combined radio frequency signals to obtain a plurality of inphase channels and a plurality of quadrature channels.

3. The method according to claim 2, comprising processing a number of said plurality of inphase channels and a number of said plurality of quadrature channels in a plurality of I-channel processing circuits and a plurality of Q-channel processing circuits to generate an output analog baseband signal.

4. The method according to claim 1, wherein said multistandard radio frequency front-end is operable to process Bluetooth® signals and a plurality of Wireless Local Area Network (WLAN) signals.

5. The method according to claim 1, wherein each of said plurality of amplifier chains comprise at least a first amplifier and a second amplifier.

6. The method according to claim 5, comprising sharing said first amplifier between a plurality of Bluetooth® signal processing paths and a plurality of WLAN signal processing paths.

7. The method according to claim 6, comprising isolating said plurality of Bluetooth® signal processing paths from a plurality of WLAN local oscillator signals by said second amplifier.

8. The method according to claim 6, comprising isolating said plurality of WLAN signal processing paths from a plurality of Bluetooth® local oscillator signals by said second amplifier.

9. The method according to claim 1, comprising demodulating said plurality of substantially equal-gain-combined signals by using a plurality of transconductance multipliers.

10. The method according to claim 3, comprising filtering said plurality of inphase channels and said plurality of quadrature channels using a plurality of transimpedance amplifiers with low-pass filtering characteristics in said plurality of I-channel processing circuits and said plurality of Q-channel processing circuits.

11. The method according to claim 3, comprising amplifying said plurality of inphase channels and said plurality of quadrature channels using a plurality of transimpedance amplifiers with low-pass filtering characteristics in said plurality of I-channel processing circuits and said plurality of Q-channel processing circuits.

12. The method according to claim 3, wherein said plurality of I-channel processing circuits and said plurality of Q-channel processing circuits comprise a plurality of filters that are switchable between a plurality of filtering characteristics.

13. The method according to claim 12, comprising compensating DC offset introduced by said plurality of filters using a plurality of DC loops.

14. The method according to claim 3, wherein said plurality of I-channel processing circuits and said plurality of Q-channel processing circuits comprise a plurality of variable gain filters.

15. The method according to claim 14, comprising offsetting DC offset introduced by said plurality of variable gain amplifiers using a plurality of DC loops.

16. A system for processing communication signals, the system comprising:
one or more circuits comprising a plurality of amplifier chains in a multistandard radio frequency front-end comprising one or more shared processing stages; said one or more circuits operable to:
amplify a plurality of radio frequency signals in one or more respective one or ones of said plurality of amplifier chains in said multistandard radio frequency front-end, wherein said plurality of radio frequency signals are compliant with a plurality of radio communication standards;
share said one or more shared processing stages between two or more of said plurality of amplifier chains;
amplify signals compliant with different ones of said plurality of radio frequency communication standards in each of said two or more of said plurality of amplifier chains; and
combine, with substantially equal gain, a number of phase-shifted radio frequency signals of said plurality of radio frequency signals into a plurality of substantially equal-gain-combined radio frequency signals.

17. The system according to claim 16, wherein said one or more circuits demodulate said plurality of substantially equal-gain-combined radio frequency signals to obtain a plurality of inphase channels and a plurality of quadrature channels.

18. The system according to claim 17, wherein said one or more circuits comprises a plurality of I-channel processing circuits and a plurality of Q-channel processing circuits, which processes a number of said plurality of inphase channels and a number of said plurality of quadrature channels to generate an output analog baseband signal.

19. The system according to claim 16, wherein said multistandard radio frequency front-end is operable to process Bluetooth® signals and a plurality of Wireless Local Area Network (WLAN) signals.

20. The system according to claim 16, wherein said one or more circuits comprises at least a first amplifier and a second amplifier in each of said plurality of amplifier chains.

21. The system according to claim 20, wherein said one or more circuits share said first amplifier between a plurality of Bluetooth® signal processing paths and a plurality of WLAN signal processing paths.

22. The system according to claim 21, wherein said one or more circuits isolate said plurality of Bluetooth® signal processing paths from a plurality of WLAN local oscillator signals by said second amplifier.

23. The system according to claim 21, wherein said one or more circuits isolate said plurality of WLAN signal processing paths from a plurality of Bluetooth® local oscillator signals by said second amplifier.

24. The system according to claim 16, wherein said one or more circuits comprises a plurality of transconductance multipliers, which demodulate said plurality of substantially equal-gain-combined signals.

25. The system according to claim 18, wherein said one or more circuits comprises a plurality of transimpedance amplifiers with low-pass filtering characteristics in said plurality of I-channel processing circuits and said plurality of Q-channel processing circuits, which filters said plurality of inphase channels and said plurality of quadrature channels.

26. The system according to claim 18, wherein said one or more circuits comprises a plurality of transimpedance amplifiers with low-pass filtering characteristics in said plurality of I-channel processing circuits and said plurality of Q-channel processing circuits, which amplifies said plurality of inphase channels and said plurality of quadrature channels.

27. The system according to claim 18, wherein said one or more circuits comprises a plurality of filters within said plurality of I-channel processing circuits and said plurality of Q-channel processing circuits, which are switchable between a plurality of filtering characteristics.

28. The system according to claim 27, wherein said one or more circuits comprising a plurality of DC loops, which compensates for DC offset introduced by said plurality of filters.

29. The system according to claim 18, wherein said one or more circuits comprise a plurality of variable gain filters within said plurality of I-channel processing circuits and said plurality of Q-channel processing circuits.

30. The system according to claim 29, wherein said one or more circuits comprise a plurality of DC loops, which compensates for DC offset introduced by said plurality of variable gain amplifiers.

31. The method according to claim 1, wherein said plurality of radio transmission standards comprise WLAN 802.11 and Bluetooth.

32. The system according to claim 16, wherein said plurality of radio transmission standards comprise WLAN 802.11 and Bluetooth.

* * * * *